United States Patent [19]

Gertie

[11] Patent Number: 5,730,364
[45] Date of Patent: Mar. 24, 1998

[54] AUTOMATIC FERTILIZING DEVICE

[76] Inventor: Robert M. Gertie, 2047 S. Salida St., Aurora, Colo. 80013

[21] Appl. No.: 650,870

[22] Filed: May 20, 1996

Related U.S. Application Data

[60] Provisional application No. 60/008,235, Dec. 7, 1995.
[51] Int. Cl.$^6$ ........................................ A01G 25/06
[52] U.S. Cl. ........................... 239/201; 239/310; 239/600
[58] Field of Search ............................ 231/10, 310, 200, 231/201–208, 318

[56] References Cited

U.S. PATENT DOCUMENTS

| | | | |
|---|---|---|---|
| 2,805,099 | 9/1957 | Bailey | 239/201 |
| 2,908,445 | 10/1959 | Schwartz . | |
| 2,944,561 | 7/1960 | Zellati | 239/310 X |
| 3,351,290 | 11/1967 | Baldwin | 239/201 X |
| 3,367,353 | 2/1968 | Hunter | 239/310 X |
| 3,419,360 | 12/1968 | Rak . | |
| 3,618,539 | 11/1971 | Daniels . | |
| 3,794,245 | 2/1974 | Wilson | 239/206 |
| 3,833,177 | 9/1974 | Pasley et al. . | |
| 4,249,562 | 2/1981 | King | 239/310 X |
| 4,823,829 | 4/1989 | Woods | 239/310 X |
| 5,364,030 | 11/1994 | Murdock et al. . | |

FOREIGN PATENT DOCUMENTS

| | | | |
|---|---|---|---|
| 83848 | 1/1869 | France | 239/202 |
| 237089 | 7/1925 | United Kingdom . | |

*Primary Examiner*—Kevin Weldon
*Attorney, Agent, or Firm*—Richard C. Litman

[57] ABSTRACT

An automatic fertilizing device is installed inline with a below ground water line for an underground sprinkler system, thus placing the entire device below the surface. The device comprises a fertilizer tablet chamber with an inlet and outlet at opposite ends, which are connected to the inlet and outlet side of the water line. A fertilizer replenishment passage extends upwardly from the chamber, with an upper end positioned at or below ground level. One or more inlet and outlet screens may be provided at each end of the chamber, thus preventing the entrance of small particles of the solid fertilizer tablet into either the inlet or outlet line as the tablet is slowly dissolved by water flow therearound. The closure for the passage may include a fertilizer tablet retainer extending downwardly therefrom, to retain the tablet within the full flow of water through the chamber and to prevent the tablet from rising into the replenishment passage. A solid fertilizer tablet is placed into the passage to the chamber and the closure sealed in the passage, and the sprinkler system is operated normally to provide automatic distribution of dissolved fertilizer material with the water dispensed from the sprinkler system. The present device thus provides an unobtrusive, inexpensive, and fully automatic method of distributing fertilizer over any area covered by the sprinkler system with which the device is installed, with the device requiring only periodic inspection of the chamber contents and replenishment of the fertilizer tablet as required.

20 Claims, 4 Drawing Sheets

AUTOMATIC FERTILIZING DEVICE

REFERENCE TO RELATED PATENT APPLICATION

This patent application is based upon provisional patent application Ser. No. 60/008,235, filed on Dec. 7, 1995.

BACKGROUND OF THE INVENTION

1. Field of the Invention

The present invention relates generally to fertilizing systems and devices for lawns and other cultivated areas, and more specifically to a fertilizing device which is installed inline with an existing below ground lawn sprinkler installation. A chamber is installed in the line, with the chamber serving to contain a solid fertilizer pellet therein. The fertilizer pellet is gradually dissolved as water flows through the system and chamber, thus automatically distributing small amounts of the fertilizer with each watering of the lawn. A generally vertical tube extends from the chamber to the surface to provide access to the chamber for replenishing the fertilizer.

2. Description of the Prior Art

The desire to have an attractive lawn and other plantings is almost universal among suburbanites, and as a result numerous products and systems have been developed over the years in an effort to produce the desired effect. However, most suburban dwellers have found that the development of a lawn and yard with a healthy and pleasing appearance, is not at all an automatic operation. Rather, it generally takes a fair amount of work and time, with time being in limited supply for many people today. Accordingly, fully automated systems which require a minimum amount of care and upkeep, are of great value to most homeowners, particularly such systems which may be implemented at relatively low cost and effort. The present automatic fertilizer system meets these desirable goals quite well and is also completely concealed in an underground installation, whereas the various devices known in the prior art differ in various respects, as discussed below:

U.S. Pat. No. 2,908,445 issued to Harold H. Schwartz on Oct. 13, 1959 describes Fountain Detergent Brushes And Controls Therefor, generally comprising an elongate tubular handle with a concentric soap dispensing chamber around a portion thereof. The soap chamber is moved axially back and forth over the tubular handle, to communicate with or cover passages in the tube to allow soap to flow from the chamber into the tube as desired. A manually actuated rotary flow control valve is also provided in the tubular handle. The Schwartz apparatus is not adapted for below ground installation, due to the manually operated components thereof. As the Schwartz device dispenses liquid, rather than solid material, no substantial fluid flow is required through the soap chamber. The present invention provides for the flow of all water directly through the fertilizer chamber, which is concentric and integrated with the water flow inlet and outlet lines.

U.S. Pat. No. 3,351,290 issued to Edward K. Baldwin on Nov. 7, 1967 describes a Lawn Treating System having an above ground fertilizer tank installed in parallel with the sprinkler water line, rather than in series as with the present invention. Flow through the tank is selectively controlled by the operator, rather than being completely automatic as in the present invention. Moreover, the Baldwin system is not adapted for the dispensing of dissolved solids, as no means is provided by Baldwin to prevent solid particles from blocking the flow.

U.S. Pat. No. 3,419,360 issued to Stanley F. Rak on Dec. 31, 1968 describes a Chemical Feeder Device disposed in parallel with a water line. Only a small percentage of water flow through the line passes through the Rak device by means of connecting capillary tubes, whereas the present invention is in series with the water line to accept the entire flow thereof. Rak discloses the use of a solid granulated material (not a single solid pellet or tablet), but does not provide any means to prevent the granules from blocking flow from the capillary tubes, as the water flow through the Rak device is not sufficient to produce sufficient dynamic force to dislodge such granules.

U.S. Pat. No. 3,618,539 issued to Jay S. Daniels on Nov. 9, 1971 describes a Device For Supplying Plant Food To Plant Roots, comprising an inline fertilizer cartridge container connected to a conventional hose and having an outlet comprising a stake perforated at its distal end. As such, the device is portable, rather than having a fixed location, as with the present invention. The inlet and outlet are not in coaxial alignment with one another, as with the present invention, thus precluding easy fixed installation in an existing line, even if such were possible with the Daniels device. Also, while Daniels provides means to preclude the large cartridge from blocking the outlet, he does nothing to prevent smaller particles from causing such blockage, as the device is intended to be hand held, with the operator being able to view the chamber and contents at all times and respond to any such blockage as required.

U.S. Pat. No. 3,833,177 issued to Harry M. Pasley et al. on Sep. 3, 1974 describes a Fluid Disseminating Device for a sprinkler system, comprising a pair of passages connected to a below ground line with a tee fitting. A dispensing container is mounted above ground to the passages. Thus, the dispensing chamber is not directly in line with the water line, as in the present invention. Moreover, the device is not fully automatic, as a handle must be manipulated by the operator to control the amount of flow through the passages. In any event, the flow through the passages to the container and back, is a small fraction of the total flow through the line to which the device is connected, whereas the present invention provides for all flow to pass through the fertilizer chamber.

U.S. Pat. No. 5,364,030 issued to James L. Murdock et al. on Nov. 15, 1994 describes a Solution Injector For Underground Sprinkler Systems. The entire apparatus is above ground, including a raised section of pipe to which the apparatus is connected in parallel. This is necessary due to the need for the operator to manipulate the various valves of the device from time to time, whereas the present invention is fully automatic and thus may be concealed completely below ground level. The valves and parallel configuration result in only a fraction of the total flow passing through the Murdock et al. device, unlike the full flow provided by the present invention.

British Patent Publication No. 237,089 to John S. G. Teller and accepted on Jul. 23, 1925 describes Improved Means For Distributing Fertilizer, comprising a tank or container connected in parallel ("shunt") with a water line. Adjustable restrictor valves are provided, thus precluding full flow through the container, as provided by the present invention. As the valves must be adjusted from time to time, the entire apparatus is disposed above ground, as evidenced by the base upon which it is mounted. Due to the need for adjustment of the valves by the operator from time to time, the device is not fully automatic, as in the present invention.

None of the above disclosures, taken either singly or in combination, is seen to describe the instant invention as claimed.

SUMMARY OF THE INVENTION

Accordingly, it is a principal object of the invention to provide an automatic fertilizing device adapted for inline installation in an new and existing below ground lawn sprinkling system, thereby placing the entire device below ground level.

It is another object of the invention to provide an automatic fertilizing apparatus having a fertilizer containment chamber disposed concentrically with an inlet and an outlet water line and communicating directly therewith, with all water flowing through the water line passing through the chamber.

It is a further object of the invention to provide an automatic fertilizer device including at least one inlet screen and at least one outlet screen, to preclude passage of any solid particles of fertilizer from the chamber, and thus serving to prevent any obstruction of any water passages, valves, and sprinkler heads due to such particles.

Still another object of the invention is to provide an automatic fertilizing device including a fertilizer replacement passage extending upwardly from the chamber and communicating internally therewith, with fertilizer tablet retention means depending from a closure removably securable in the upper end of the passage.

Yet another object of the invention is to provide an automatic fertilizing device in combination with a below ground installed sprinkler system including a supply line having an anti-siphon valve therein upstream of the fertilizing device, and a sprinkler control valve and at least one sprinkler downstream of the device.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
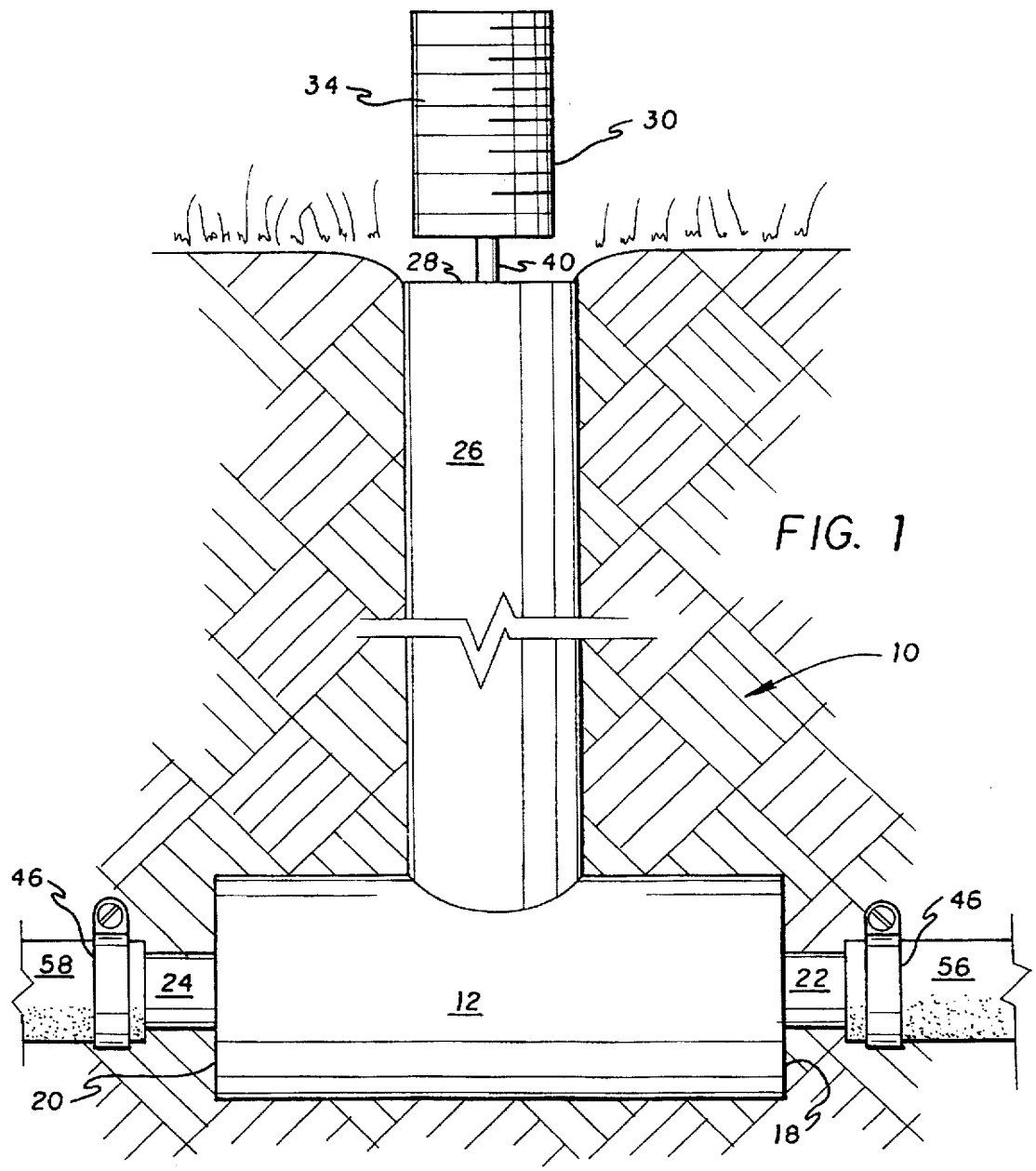
FIG. 1 is a schematic elevation view of the present automatic fertilizing device, showing its general configuration and installation completely below ground level.
Figure 2:
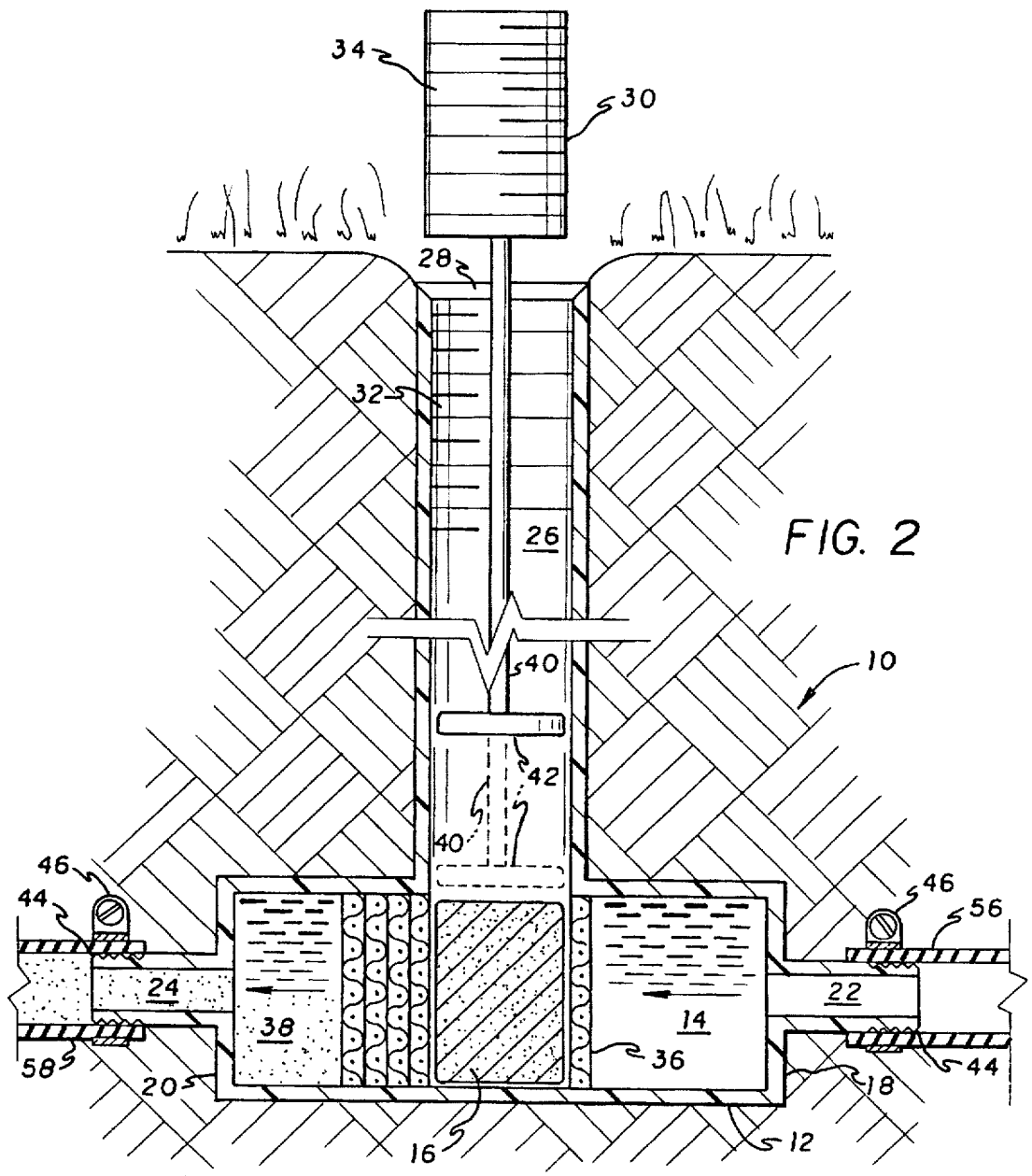
FIG. 2 is a schematic elevation view in section of the device of FIG. 1, showing its internal components, operation, and water flow therethrough.
Figure 4:
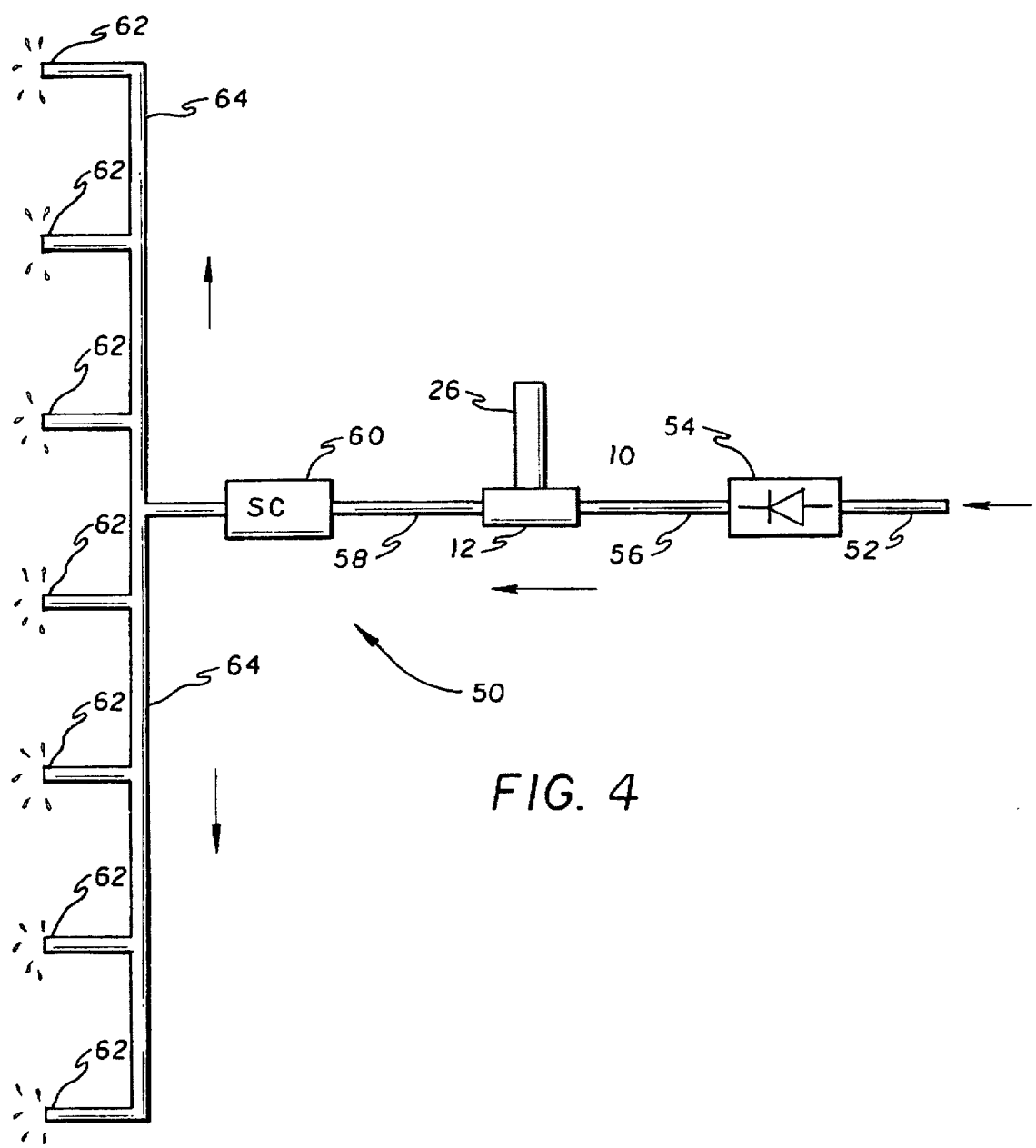
FIG. 4 is a schematic elevation view of the present device in combination with a sprinkler system and its components.

Referring now particularly to FIGS. 1 and 2 of the drawings, the present invention will be seen to comprise an automatic fertilizing device 10, which is disposed completely below, or no higher than, ground level. The device 10 may be provided in combination with an underground sprinkler system, as shown in FIG. 4 and described further below.

A generally cylindrical chamber 12 includes an internal volume 14 therein (FIG. 2), adapted for the installation and containment of a solid tablet 16 of a chemical or organic lawn or vegetation fertilizer product. The tablet 16 is adapted to be water soluble, and to dissolve slowly in the presence of a flow of water thereover. The chamber 12 has an inlet end 18 and an opposite outlet end 20, with a water inlet passage 22 and water outlet passage 24 respectively extending concentrically from the ends 18 and 20 and communicating with the internal volume 14 of chamber 12.

Figure 3:
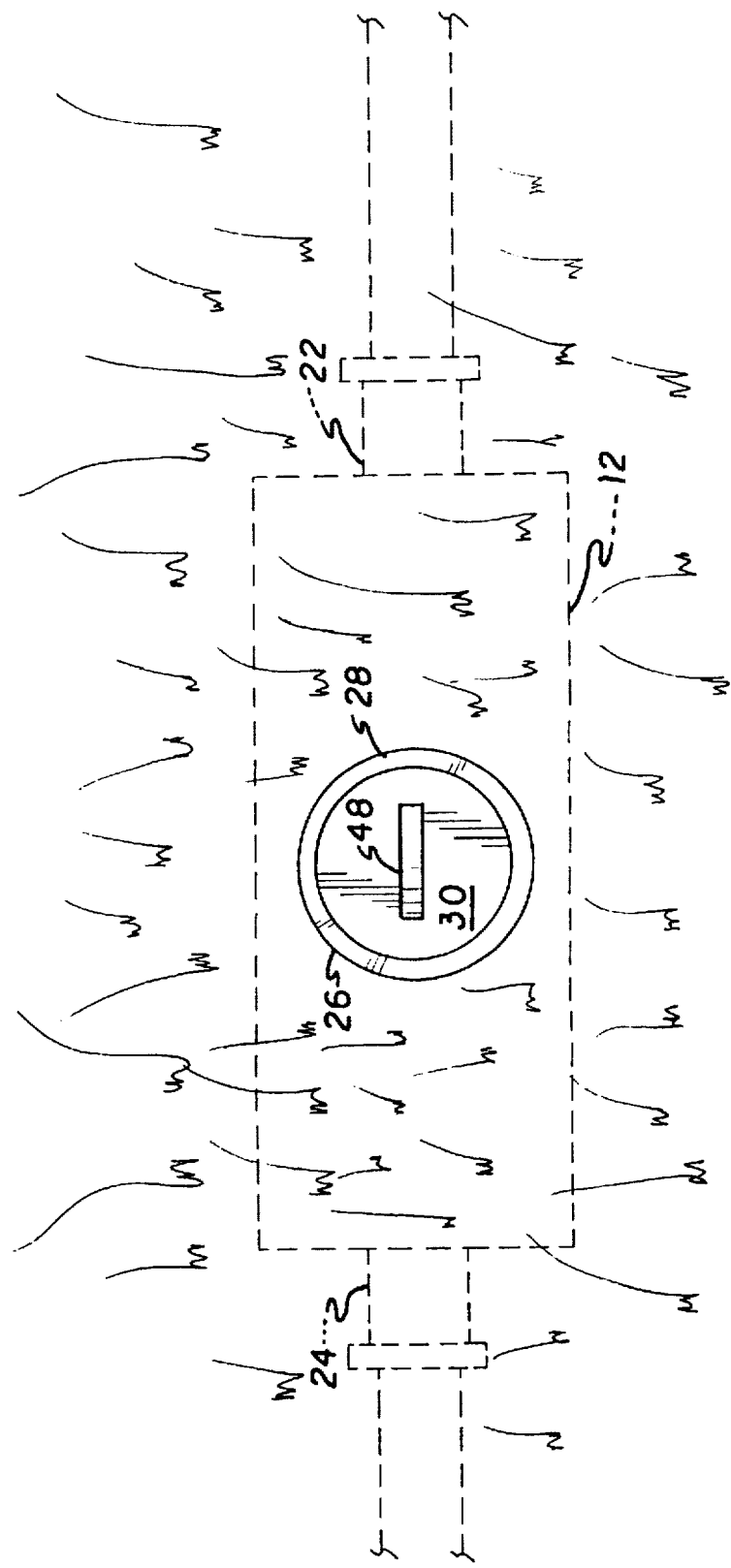
FIG. 3 is a top plan view of the present device as installed beneath the surface, showing the above ground accessible fertilizer replenishment passage and closure.

As the chamber 12 of the present automatic fertilizing device 10 is adapted to be installed below ground level, as indicated in FIGS. 1 through 3, some means of accessing the interior volume 14 of the chamber 12 is required, in order that the fertilizer tablet 16 contained therein may be replenished from time to time as it is dissolved and distributed with water flowing through the system. Accordingly, a fertilizer tablet replenishment passage 26 is provided, which extends perpendicularly and generally upwardly from the center of the chamber 12. This passage has an open uppermost end 28, with the chamber 12 preferably being installed at a sufficient depth to place the uppermost end 28 of the passage 26 slightly below, or at least no higher than, the surface of the terrain. The uppermost end 28 of the passage 26 is adapted to accept a closure 30 (cap, etc.) therein, e.g., by internal threads 32 within the passage uppermost end 28, and mating external threads 34 on the closure 30. The top of the cap or closure 30 is adapted to seat flush with, or slightly below, the passage uppermost end 28.

To avoid clogging the outlet passage 24 with the solid tablet 16 as water flow through the chamber 12 urges the tablet toward the outlet end 20 of the chamber, some form of tablet retention means is provided, preferably to each side of the tablet 16, as shown in FIG. 2. The tablet retention means preferably comprise at least one inlet screen 36 and outlet screen 38, respectively disposed across the internal volume 14 of the chamber 12 and adjacent to the opening of the chamber 12 to the tablet replenishment passage 26, to the inlet and outlet sides thereof, i.e., immediately upstream and downstream of the passage 26. Also, while "at least one screen" is described for both the inlet screen 36 and outlet screen 38, preferably, a plurality of outlet screens 38 (e.g., four, as shown in FIG. 2) are provided, to assure that small particles of the tablet 16 are not washed into the outlet side of the device 10 and carried through the system, possibly clogging the relatively fine spray outlets of any sprinkler head(s) downstream of the device.

These screens 36 and 38 are preferably formed of some material which is not readily prone to rust or corrosion, and which will provide a long life in the installation. Copper, stainless steel, and/or various types of plastic strands or fibers have been found to work well in such an environment. Preferably, at least one of the outlet screens 38 is provided with a mesh which is no larger than the smallest passage through which the water flows in the system, i.e., the sprinkler head orifices. The inlet screen(s) may have a larger mesh, sufficient to preclude backflow of any significant particles of the tablet 16 as it is dissolved.

While the inlet and outlet screens 36 and 38 serve to retain the tablet 16 longitudinally within the chamber 12, the typical amount of water flowing through the chamber 12 to provide sufficient quantities for lawn or other irrigation purposes may result in a fair amount of turbulence within the chamber 12 and upwardly into the tablet replenishment passage 26. This turbulence may be sufficient to carry a tablet 16, particularly one which has had its mass reduced by dissolution over a period of time, upwardly into the passage 26. Accordingly, further fertilizer tablet retention means serving to preclude movement of the tablet 16 upwardly into the replenishment passage 26, may be provided.

FIG. 2 discloses such means, wherein an elongate rod 40 is provided extending downwardly from the lower end of the closure or cap 30. The rod 40 has a length equal to that of the replenishment passage 26 less the depth of the closure 30, so that the lower end of the rod 40 is positioned at the lower end of the replenishment passage 26 and immediately adjacent the interior volume 14 of the chamber 12 when the closure 30 is fully seated within the uppermost end 28 of the tablet replenishment passage 26. The rod 40 has a tablet retainer 42 (e.g., a disc, etc.) disposed at its lower end, which fits closely within the internal diameter of the cylindrical passage 26. Thus, once the closure 30 has been completely secured within the uppermost end 28 of the passage 26, a tablet 16 within the chamber 12 is retained completely within the internal volume 14 thereof by the screens 36 and 38 and retainer 42, as shown by the broken line position of the retainer 42 in FIG. 2.

As the present automatic fertilizing device 10 is adapted for permanent below ground installation with a below ground sprinkler line installation, preferably the chamber 12, its ends 18 and 20, the corresponding inlet and outlet passages 22 and 24, and the replenishment passage 26 (as well perhaps as the closure cap 30, retainer rod 40, and retainer 42), are formed of a sturdy, durable material which is essentially impervious to rusting or corrosion while buried in the relatively moist environment of a garden or lawn. Further, it is well known that certain types of fertilizing chemicals can also be corrosive. Accordingly, the present device 10 and its various components may be formed of a durable plastic material of some sort, such as a high density polyvinyl chloride, or other suitable material as may be desired.

The present automatic fertilizing device 10 is connected in series with the water supply line of a below ground sprinkler system, as shown in FIG. 4. As such water supply lines are buried and subject to the same harsh environment as the present device 10, the water supply lines are often formed of a resilient plastic material. Accordingly, the chamber inlet and outlet passages 22 and 24 may be provided with external hose barbs 44 as shown in FIG. 2, adapted to provide a better grip for such resilient lines secured thereover. Conventional stainless steel hose clamps 46 or other suitable means may be used to provide further security for the supply line to inlet and outlet passage connections. Alternatively, some other connection means, as shown in FIG. 3, may be used for other types of supply pipes.

FIG. 4 provides a schematic view of a typical underground sprinkler system 50 layout, with a water supply line 52 providing water from an appropriate source, e.g., permanent or semipermanent connection to the household or other water system (not shown). An anti-siphon or anti-backflow valve 54 is typically provided in the supply line 52 downstream from the supply line connection to the water supply, in order to preclude backflow of any contaminants into the water supply in the event that water pressure should be lost. The present automatic fertilizing device 10 is installed further downstream in the water line, with the portion or section of the water line upstream of the device 10 being defined as the inlet line 56, and the portion or section of the line downstream of the device 10 being defined as the outlet line 58, relative to the device 10.

A sprinkler control 60, designated as "SC" in FIG. 4, is located downstream of the device 10, and comprises suitable valve means to control the flow of water through the system 50 as desired. From the control 60, water is distributed to one or more sprinkler heads 62, by means of a water distribution manifold 64. (It will be seen that the present automatic fertilizing device 10 may be used to provide dissolved fertilizer in water supplied to only a single sprinkler head, but it is expected that typically the present device 10 will be used with sprinkler systems having a plurality of sprinkler heads, as in the sprinkler system 50 schematic of FIG. 4.)

The present automatic fertilizing device 10 may be installed with an existing sprinkler system by first shutting off the water supply and then digging a small hole in the desired location along the water supply line of the sprinkler system. A hole about one foot in diameter is sufficient, as the chamber 12 and associated inlet and outlet passages are only about seven inches long. As the typical below ground sprinkler system installation is only about one foot below ground, the hole for the addition of the present device 10 need not be much deeper than that, as only another inch or two of clearance is required for the diameter of the chamber 12. (With a typical depth of one foot for most below ground sprinkler supply lines, the height of the replenishment passage 26 need only be about ten inches from the top of the chamber 12. The height of the passage 26 may be adjusted as required, depending upon the depth of the sprinkler water supply line installation, to place the uppermost end 28 of the passage 26 at or slightly below grade.)

At this point, a section equal to the length of the chamber 12 (e.g., five inches) is cut from the exposed water supply line, and the resulting inlet line 56 and outlet line 58 ends slipped over the respective inlet and outlet passages 22 and 24; the fertilizer replenishment passage is oriented generally vertically upwards during this operation. Hose clamps 46 or other suitable means may be used to provide further security for the connections. The access hole is then filled in, with the uppermost end 28 of the replenishment passage 26 positioned at or slightly below grade, the water supply turned on, and the device 10 is ready for use.

The present device 10 is used by shutting off the water supply, removing the closure cap 30, and dropping a suitable solid fertilizer tablet 16 into the replenishment passage 26. Closure cap 30 is then reinstalled in the uppermost end 28 of the passage 26, with the retainer 42 insuring that the tablet 16 is positioned directly in the interior volume 14 of the chamber 12, between the inlet and outlet screens 36 and 38. (The closure 30 may include a slot 48 or other gripping means to enable a person to remove and replace the cap 30 as required, as shown in FIG. 3.) The water supply is then turned on, and the device 10 is ready for use.

The fertilizer tablet retention chamber 12 of the present device 10 is connected directly in series with the entire water supply of the sprinkler system, and thus 100 percent of all water distributed to the sprinkler system passes around the tablet 16; no water is able to bypass the fertilizer tablet chamber 12. Thus, all water which is distributed from the sprinkler head(s) 62, will contain some slight amount of dissolved fertilizer or plant food therein, thus insuring good distribution of the fertilizer or plant food material with each watering.

It is expected that a fertilizer tablet 16 of approximately one to two cubic inches volume, will be sufficient to last for on the order of fifteen watering sessions, depending upon the length of each session, time between sessions, and the composition and density of the tablet 16. When the tablet 16 has nearly completely dissolved, another such tablet may be placed in the chamber 12 in the manner described above.

In summary, the present automatic fertilizing device 10 will be seen to provide an extremely simple and easy means of insuring that a lawn, garden or the like which is irrigated by an underground system, is supplied with fertilizer, plant food, or other needed treatment, on a regular basis each time the sprinkler or watering system is used. The device 10 is fully automatic, and requires no additional effort, valve operation, or other work, other than turning on the sprinkler water system as desired. The user of the present system need only shut off the water supply periodically and open the closure cap 30 to check the remaining volume of the fertilizer tablet 16 within the chamber 12. (The tablet 16, if any, will be readily visible directly below the replenishment passage 26, as the inlet and outlet screens 36 and 38 serve to prevent the shifting of the position of the tablet 16 from the center of the chamber 12.)

Moreover, the present device 10 is completely unobtrusive in its installation and operation, as the entire device is concealed in the ground, along with the water system with which it is installed. The only visible portion of the device 10, is the closure cap 30 which seats flush with the uppermost end 28 of the replenishment passage 26, and is disposed no higher than grade. Thus, mowing and other yard maintenance activities are also greatly simplified by the installation of the present device 10.

It is to be understood that the present invention is not limited to the embodiments described above, but encompasses any and all embodiments within the scope of the following claims.

I claim:

1. An automatic fertilizing device, comprising:
    a fertilizer tablet chamber having an internal volume, an inlet end, and an opposite outlet end, with said inlet end and said outlet end respectively having an inlet passage and an outlet passage extending concentrically therefrom and communicating with said internal volume of said chamber;
    said inlet passage and said outlet passage being permanently connected respectively to a below ground water inlet line and outlet line, with said chamber thereby being disposed below ground and concentrically in series between the water inlet line and outlet line so that all water flowing between said inlet passage and said outlet passage is caused to flow through said chamber;
    a fertilizer tablet replenishment passage extending upwardly from said chamber and communicating with said internal volume thereof, said replenishment passage having an uppermost end adapted to be disposed no higher than ground level and devoid of any above ground protrusion, and;
    said fertilizer tablet replenishment passage including closure means removably installable therein, said closure means adapted to extend no higher than said uppermost end of said passage when said closure means is completely seated within said passage, whereby;
    said automatic fertilizing device is permanently installed with a below ground water inlet line and outlet line with all components of said device being disposed no higher than ground level, a solid fertilizer tablet is placed within said chamber by means of said replenishment passage, and water is allowed to flow through said chamber by means of the water inlet line and outlet line communicating therewith, with the water absorbing fertilizer from the tablet as the tablet is dissolved, to permit fertilization for vegetation irrigated by the water and fertilizer dissolved therein.

2. The automatic fertilizing device of claim 1, including:
    fertilizer tablet retention means serving to preclude movement of solid fertilizer tablet particles from said chamber and into said fertilizer tablet replenishment passage.

3. The automatic fertilizing device of claim 2, wherein:
    said fertilizer tablet retention means comprises an elongate rod extending downwardly from said closure means of said passage, with said rod having a lower end with a retainer thereon, said retainer adapted to fit closely within said passage and to be disposed adjacent said fertilizer tablet chamber when said closure means is completely seated within said fertilizer tablet replenishment passage.

4. The automatic fertilizing device of claim 1, including:
    fertilizer tablet retention means serving to preclude movement of solid fertilizer tablet particles from said chamber and into said inlet passage and said outlet passage and further into the water inlet line and outlet line.

5. The automatic fertilizing device of claim 4, wherein:
    said fertilizer tablet retention means comprises at least one screen disposed across said internal volume of said chamber and adjacent said fertilizer tablet replenishment passage and upstream thereof, and at least one screen disposed across said internal volume of said chamber and adjacent said fertilizer tablet replenishment passage and downstream thereof.

6. The automatic fertilizing device of claim 5, wherein:
    each said screen is formed of material selected from the group consisting of copper, plastic, and stainless steel strands.

7. The automatic fertilizing device of claim 1, wherein:
    said chamber and said replenishment passage each have cylindrical configuration.

8. The automatic fertilizing device of claim 1, wherein:
    said inlet passage and said outlet passage each include hose barbs thereon.

9. The automatic fertilizing device of claim 1, wherein:
    at least said uppermost end of said fertilizer tablet replenishment passage is internally threaded, and said closure means comprises an externally threaded cap adapted to mate with said internally threaded replenishment passage uppermost end.

10. The automatic fertilizing device of claim 1, wherein:
    said fertilizing device is formed of a plastic material.

11. A below ground sprinkler system and automatic fertilizing device installed therewith, comprising in combination:
    a sprinkler system including a water inlet line having an anti-siphon valve installed therein and extending from a water supply, a water outlet line having a sprinkler control valve installed therein and a distal end, and at least one sprinkler head installed at said distal end of said water outlet line of said sprinkler system, with at least said water inlet line and said water outlet line being installed below ground level;
    an automatic fertilizing device including a fertilizer tablet chamber having an internal volume, an inlet end, and an opposite outlet end, with said inlet end and said outlet end respectively having an inlet passage and an outlet passage extending concentrically therefrom and communicating with said internal volume of said chamber;
    said inlet passage and said outlet passage of said chamber of said fertilizing device being permanently connected respectively to said water inlet line and said water outlet line of said sprinkler system, with said chamber thereby being disposed below ground and concentrically in series between said water inlet line and said water outlet line so that all water flowing between said inlet passage and said outlet passage is caused to flow through said chamber of said automatic fertilizing device;

a fertilizer tablet replenishment passage extending upwardly from said chamber of said fertilizing device and communicating with said internal volume thereof, said replenishment passage having an uppermost end adapted to be disposed no higher than ground level and devoid of any above ground protrusion, and;

said fertilizer tablet replenishment passage including closure means removably installable therein, said closure means adapted to extend no higher than said uppermost end of said passage when said closure means is completely seated within said passage of said fertilizing device, whereby;

said automatic fertilizing device is permanently installed with said below ground water inlet line and said water outlet line of said sprinkler system with all components of said device being disposed no higher than ground level, a solid fertilizer tablet is placed within said chamber of said device by means of said replenishment passage thereof, and water is allowed to flow through said chamber by means of said water inlet line and said water outlet line communicating therewith, with the water absorbing fertilizer from the tablet as the tablet is dissolved, to permit fertilization for vegetation irrigated by the water and fertilizer dissolved therein as distributed by said sprinkler system.

12. The below ground sprinkler system and automatic fertilizing device combination of claim 11, wherein:

said automatic fertilizing device includes fertilizer tablet retention means serving to preclude movement of solid fertilizer tablet particles from said chamber and into said fertilizer tablet replenishment passage of said device.

13. The below ground sprinkler system and automatic fertilizing device combination of claim 12, wherein:

said fertilizer tablet retention means of said device comprises an elongate rod extending downwardly from said closure means of said passage, with said rod having a lower end with a retainer thereon, said retainer adapted to fit closely within said passage of said device and to be disposed adjacent said fertilizer tablet chamber of said device when said closure means is completely seated within said fertilizer tablet replenishment passage of said device.

14. The below ground sprinkler system and automatic fertilizing device combination of claim 11, wherein:

said automatic fertilizing device includes fertilizer tablet retention means serving to preclude movement of solid fertilizer tablet particles from said chamber of said device and into said inlet passage and said outlet passage of said device and further into said water inlet line and said water outlet line of said sprinkler system.

15. The below ground sprinkler system and automatic fertilizing device combination of claim 14, wherein:

said fertilizer tablet retention means of said device comprises at least one screen disposed across said internal volume of said chamber and adjacent said fertilizer tablet replenishment passage of said device and upstream thereof, and at least one screen disposed across said internal volume of said chamber and adjacent said fertilizer tablet replenishment passage of said device and downstream thereof.

16. The below ground sprinkler system and automatic fertilizing device combination of claim 15, wherein:

each said screen of said device is formed of material selected from the group consisting of copper, plastic, and stainless steel strands.

17. The below ground sprinkler system and automatic fertilizing device combination of claim 11, wherein:

said chamber and said replenishment passage of said device each have a cylindrical configuration.

18. The below ground sprinkler system and automatic fertilizing device combination of claim 11, wherein:

said inlet passage and said outlet passage of said device each include hose barbs thereon.

19. The below ground sprinkler system and automatic fertilizing device combination of claim 11, wherein:

at least said uppermost end of said fertilizer tablet replenishment passage of said device is internally threaded, and said closure means comprises an externally threaded cap adapted to mate with said internally threaded replenishment passage uppermost end.

20. The below ground sprinkler system and automatic fertilizing device combination of claim 11, wherein:

said fertilizing device is formed of a plastic material, and said water inlet line and said water outlet line of said sprinkler system are each formed of plastic material.

* * * * *